United States Patent [19]

Black et al.

[11] Patent Number: 5,078,873

[45] Date of Patent: Jan. 7, 1992

[54] FILTER CLEANING APPARATUS

[75] Inventors: Brent C. Black, Salt Lake City; Steven G. Coombs, Layton; John B. Ainsworth; John Thorum, both of Salt Lake City, all of Utah

[73] Assignee: Baker Hughes Incorporated, Houston, Tex.

[21] Appl. No.: 503,453

[22] Filed: Apr. 2, 1990

[51] Int. Cl.$^5$ ............................................. B01D 24/46
[52] U.S. Cl. .................................. 210/264; 210/271; 210/275
[58] Field of Search ............... 210/263, 264, 269, 270, 210/271, 275

[56] References Cited

U.S. PATENT DOCUMENTS

| | | |
|---|---|---|
| 3,239,061 | 3/1966 | Horning et al. |
| 3,559,954 | 2/1971 | Chambers et al. |
| 3,616,651 | 11/1971 | Chang et al. |
| 3,732,701 | 5/1973 | Lynch |
| 3,984,326 | 10/1976 | Bendel |
| 4,151,265 | 4/1979 | Ethington |
| 4,401,576 | 8/1983 | Meurer |
| 4,624,783 | 11/1986 | Black et al. |
| 4,859,330 | 8/1989 | Pauwels |
| 4,957,631 | 9/1990 | Pauwels |
| 4,988,439 | 1/1991 | Medders |

OTHER PUBLICATIONS

EIMCO, Eliminator catalog.
EIMCO, Improved Municipal Water and Wastewater Polishing Filter pamphlet.
EIMCO, Low Head Filter Continuous Operation Automatic Backwash brochure.

Primary Examiner—Frank Sever
Attorney, Agent, or Firm—Steve Rosenblatt

[57] ABSTRACT

The invention comprises an improvement in a cleaning apparatus particularly useful for filters. A mechanism drives a hood into position adjacent partitions. A sealing member is selectively actuated to seal off at least one such compartment for cleaning while the remainder of the filter remains in service. Sealing is accomplished by interaction between the hood and the partitions. The invention also relates to techniques for selectively bringing the hood into contact with the partitions, and a construction of the hood and a media support plate which allows flexibility to lilft and scour the filter media using a gas to dislodge impurities, coupled with a liquid backwash involving drawing filtered water back through the media to carry away the impurities out of the filter.

93 Claims, 7 Drawing Sheets

FILTER CLEANING APPARATUS

FIELD OF THE INVENTION

The field of this invention relates to filters and techniques, methods and apparatus for cleaning filters.

BACKGROUND OF THE INVENTION

The present invention relates to the separation of solids from liquids by filtration through granular media and, more particularly, to an improvement in apparatus for granular media filters of the type having a tank and a bed of granular filter media in the tank through which liquids having suspended or dissolved solids therein flow for removing the solids to clean the liquid.

Granular media filters are known for removing solids from liquids. Such filters have long been utilized for potable water treatment and have been introduced to wastewater treatment plants, where the solids may comprise microbial flocs, coagulant residues, and a variety of other relatively unpredictable substances. Such filters normally include a tank for receiving flowing liquid containing suspended solids, a bed of granular media supported within the tank, means for removing liquid which has passed through the media (filtrate), and means for periodically washing the granular media to remove particulates collected therein during filtration. Because the washing step is usually accomplished by passing liquid through the bed in a direction opposite to the flow direction for filtration, the washing step is usually referred to as backwashing.

In one well-known granular media filter construction, filtration is accomplished in the downward direction so that filtrate is removed from beneath the media. Such "downflow" filters may be capable of either semi-continuous or continuous operation. In this latter operation, partitioning walls are fixedly mounted to form a plurality of individual cells within the granular media bed so that backwashing can be accomplished in one of the cells while filtration proceeds in the other cells. Such filtering machines are shown in U.S. Pat. Nos. 3,239,061 and 4,151,265.

In "semi-continuous" granular media filters, the entire granular bed is used simultaneously for filtration until the bed collects solids to the extent that its resistance to flow adversely affects the rate of operation of the machine, or the effectiveness of removing solids. Then the machine is removed from filtration service and the entire bed is cleaned as a unit.

Granular media filters may also be of the type used to remove dissolved solids from liquid. Such filters typically use filter media of activated carbon, which physically adsorbs dissolved solids from the liquid. Over time, the activated carbon may adsorb so much dissolved materials as to become saturated or spent. In this event, the spent filter media must be removed from the filter, and new or regenerated media delivered to the filter. Similarly, in granular media filters of the above-described type used to remove suspended solids, the media may after long usage be rendered unsuitable for further filtering, even if backwashed. This media must then be removed, and new media or media cleaned by methods other than backwashing must be delivered to the filter. With either type of filter, the filtration operation of the filter must be terminated while the filter media is being replaced.

A low-head filter apparatus is shown in U.S. Pat. No. 4,624,783. This filter employs a pair of rails, 39a and b, mounted to the top of the filter which support a bridge 31, which in turn supports a partitioning chamber 41. The bridge translates along the rails while the partitioning chamber 41 can be selectively raised or lowered. Partitioning chamber 41 cuts through a section of the media 23, in effect isolating that section, while the balance of the media 23 is available for filtration. With the partitioning chamber 41 lowered through the media 23, that section of the media within the chamber could be backwashed or the media within that partitioning chamber 41 could be completely removed and replaced. A series of valves 57 are included in the partitioning chamber 41 to facilitate venting of entrapped vapors and allow the chamber 41 to move downwardly into the media 23. While this design proved advantageous, it was costly to construct and on occasion presented certain difficulties in obtaining an adequate seal between the underdrain support means 19 and partitioning chamber 41. Occasionally the media 23 became so hard as to impede the downward travel of hood 41 and prevent uniform contact between hood 41 and underdrain support means 19.

Subsequent modifications were made to install a plurality of upwardly extending partition plates from underdrain support means 19. The hood 41 was still used, but instead of having to be lowered down to underdrain support means 19, the hood would be lowered between a pair of upwardly extending partitions. In this design, hood 41 did not have to be brought all the way down to underdrain support means 19. There would be a clearance fit between the hood 41 and the partitions, and what sealing was obtained was achieved when the hood 41 was made to descend onto the partitions to attempt to isolate a given compartment. Some designs incorporated a rigid neoprene member to assist in the compartment isolation. A vacuum source was then applied to partitioning chamber 41 which, depending upon its position in the media, would induce clean water from the filtrate receiving chamber 21 up through hood 41 for backwashing. Other means were provided with the hood to actually remove the filter media through the use of devices such as an eductor. U.S. Pat. No. 4,624,783 also disclosed retractable and movable means with the chamber 41 for the purpose of using a compressible fluid to assist prior to the actual water backwash step. The mechanism shown included a series of probes or lances carried on a movable manifold in communication with a source of pressurized air or liquid wherein the probes 81 could be inserted into the bed.

U.S. Pat. No. 3,984,326, entitled "Gravity Filtering Equipment," showing Mr. Henry Bendel as the inventor, is for gravity filtering equipment comprising a basin partitioned into a plurality of compartments, each having a permeable bottom covered by a filtering bed and a device for flushing such filtering beds. This device comprises a bell adaptable fluid-tightly onto the upper edges of each compartment in turn and provided with a pump for sucking up filtered water, from a collecting chamber provided underneath the permeable bottom of each such compartment, through its filtering bed.

While all the embodiments discussed above proved to be serviceable, the designs still allowed for improvements to be made in the overall cost of construction of such filters, as well as in obtaining greater efficiencies in the sealing isolation of individual compartments being serviced within the filter. The apparatus of the present invention addresses these areas in providing improved sealing techniques for the compartments within the filter, a drive mechanism for the cleaning apparatus which results in greater economies in construction and operation, and an improved technique of lifting and scouring the filter media with a gas to dislodge collected impurities prior to backwashing by fluidizing with water to carry away such impurities.

SUMMARY OF THE INVENTION

The invention comprises an improvement in a cleaning apparatus particularly useful for filters. A mechanism drives a hood into position adjacent partitions. A sealing member is selectively actuated to seal off at least one such compartment for cleaning while the remainder of the filter remains in service. Sealing is accomplished by interaction between the hood and the partitions. The invention also relates to techniques for selectively bringing the hood into contact with the partitions, and a construction of the hood and a media support plate which allows flexibility to fluidize the filter media to dislodge impurities, coupled with a backwash involving drawing filtered water back through the media to carry away the impurities out of the filter.

DETAILED DESCRIPTION OF THE PREFERRED EMBODIMENT

Figure 1:
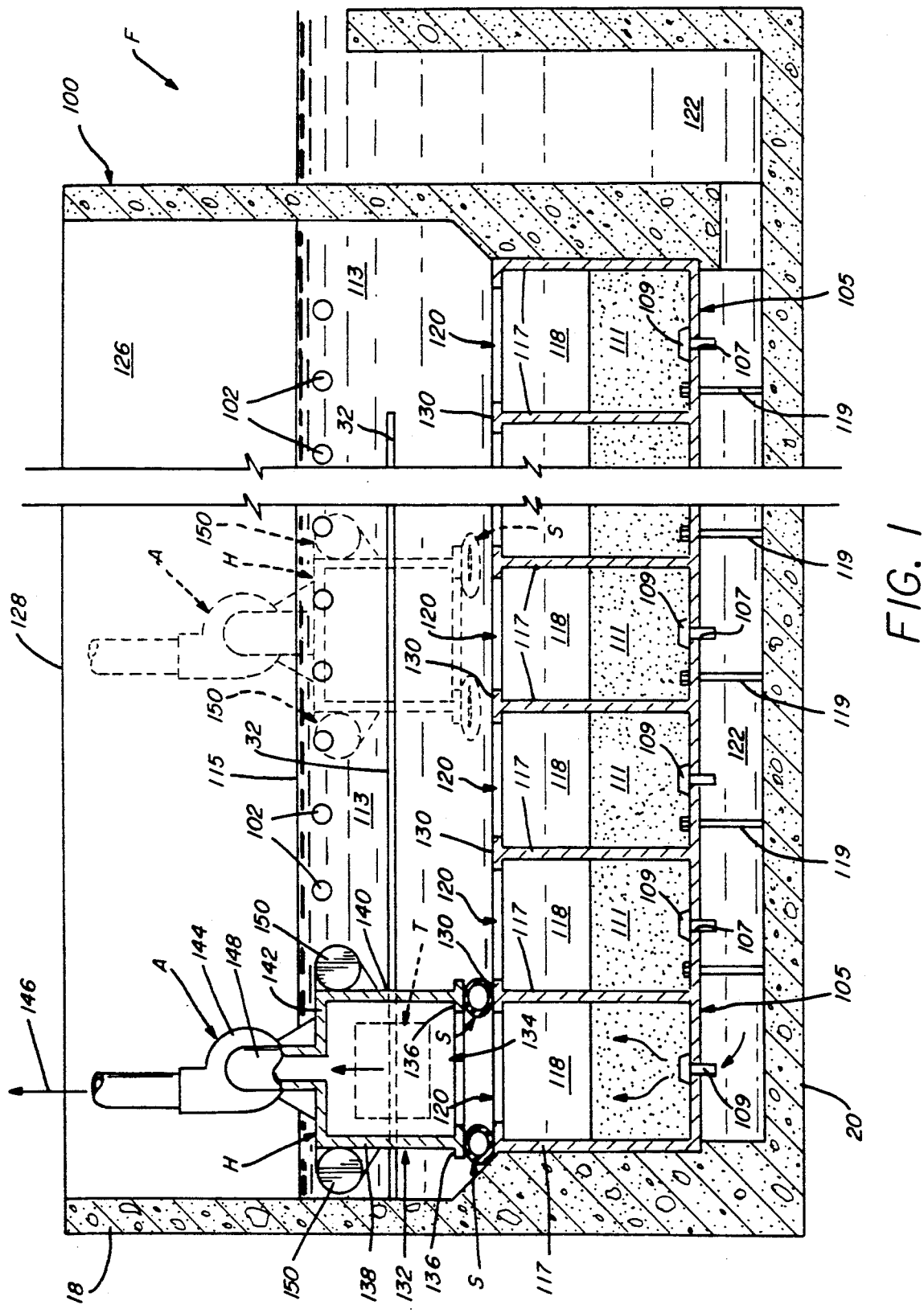
FIG. 1 is a sectional elevational view of a filter showing the adjustable sealing mechanism.
Figure 2:
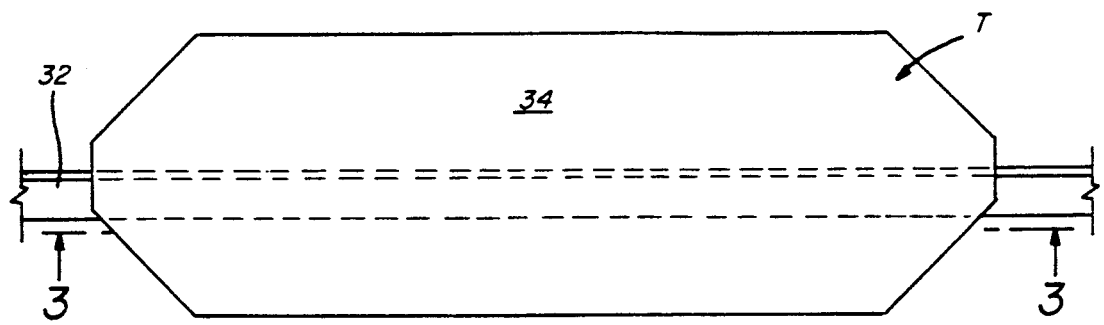
FIG. 2 is an elevational view of the driving apparatus.
Figure 14:
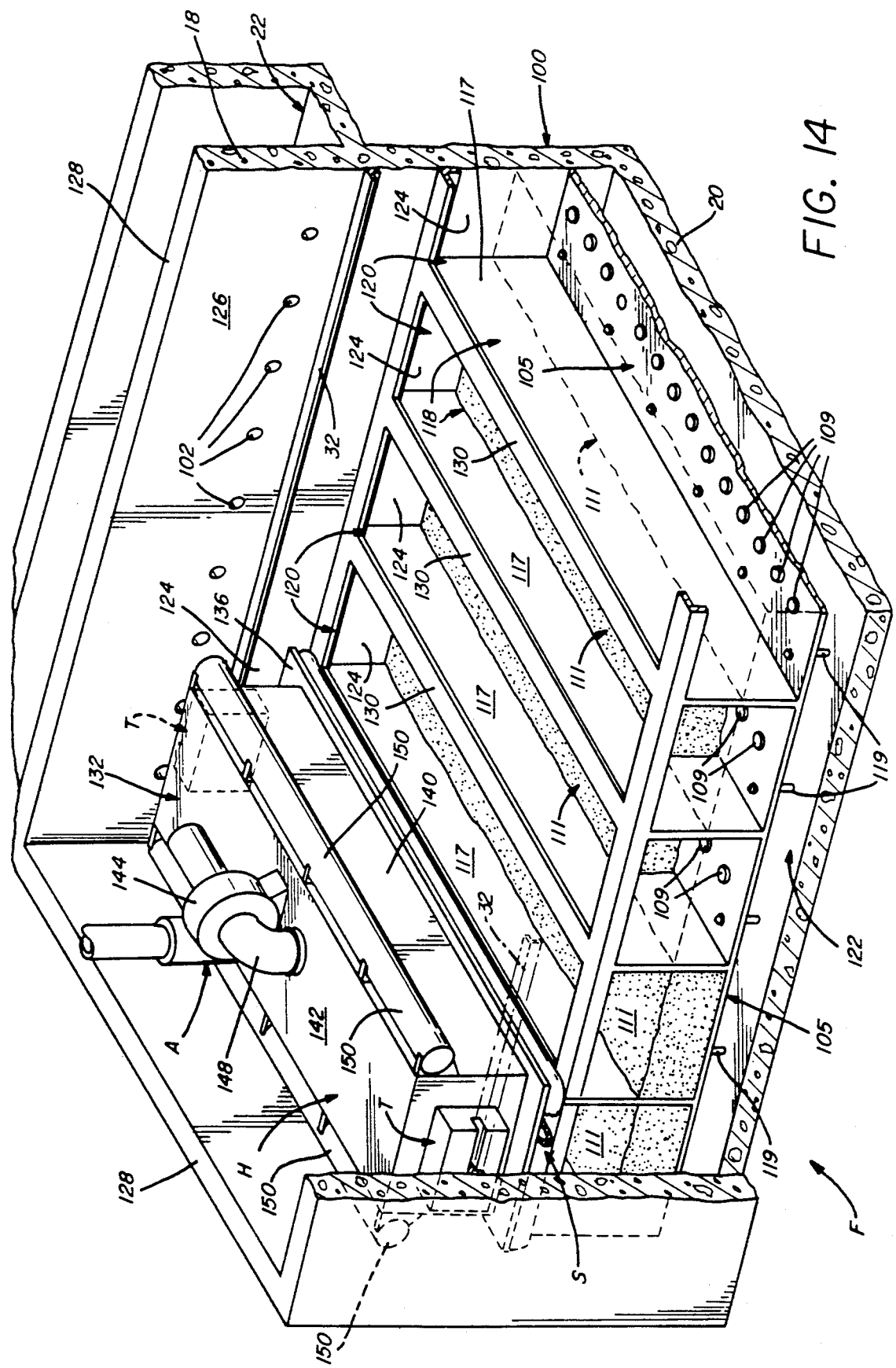
FIG. 14 is a perspective view of FIG. 1, showing generally the support for the hood and the filter layout.

As seen in FIGS. 1 and 14, the apparatus of the present invention is preferably applied to a low-head filter F. Filter F comprises an enclosure 100, which includes a sidewall 18 and a floor 20. Fastened to the vessel sidewall 18 is a series of holes 102 to distribute the influent liquid which comes through trough 22. Referring to FIG. 1, the filter F has a media support surface 105, which has a series of openings 107. Suitable support members 119 hold media support surface 105 at a fixed distance from the filter bottom. Each opening 107 has a nozzle 109. "Nozzle" is intended to include equivalents previously described. A bed 111 is supported on media support surface 105. The bed can be entirely made of sand, anthracite, activated charcoal, or some garnet, or combination of all types previously described, and its height is determined by the specifics of the particular application. Above the bed 111 is unfiltered liquid, generally described as 113. The liquid level is variable in the filter F. The resistance to flow in the bed 111 creates a level of approximately six-twelve inches (6"–12") to overcome the head loss. As the bed 111 fouls during use, the liquid level in the filter F builds up, generally in the range of an additional eighteen inches (18") above the normal six-twelve inches allotted for head loss when the bed 111 is clean. Thus, the water level 115 is variable during operation of the filter. The filter includes a plurality of partitions 117 which, as shown in FIG. 14, extend across the filter F. Partitions 117 create compartments 118. The compartments 118 are open at the top, as indicated by 120. There is also fluid communication from the filtrate receiving chamber 122, through nozzles 109 into compartments 118. It should be noted that equivalent devices to nozzles 109 in openings 107 can be used without departing from the spirit of the invention. These equivalent devices include but are not limited to porous plates made of plastic or sintered metal or stainless steel, stainless steel tubular perforated with gravel, and header and lateral piping systems. Such alternative systems are included whenever reference is made to nozzles and/or openings in this application, including the claims.

As shown in FIG. 14, partitions 117 are connected at each end by end walls 124 to effectively define compartments 118. End walls 124 can be placed a distance away from the interior face 126 of wall 18. A track 32 can be disposed in the clearance space. Alternative placements of track 32 within the filter F such as between interior faces 126 are also within the spirit of the invention. Translation means T is connected to track 32. It is understood that track 32 can be made out of structural members or a cable or other suitable equivalent which spans interior face 126 and is capable of supporting translation means T and the loads imposed on it. It should also be noted that alternative constructions are within the purview of the invention. For example, partitions 117 can extend from interior face 126 to its opposing face and be sealed thereto. In this variation, the track 32 is mounted above the open tops 120 of the compartments 118. Regardless of the precise location of track 32, it should be noted that the assembly differs from the support mechanisms disclosed in U.S. Pat. No. 4,624,783 in that there are no large support rails located on the top 128 of wall 18. The translation mean T is described in more detail below and by reference to FIGS. 2–13.

Each of the partitions 117 has a sealing surface 130, which as shown in FIG. 1 is preferably a flat plate mounted in a plane transverse to partitions 117. Other sealing surfaces can be employed without departing from the spirit of the invention. For example and not by way of limitation, instead of using a flat plate 130 to extend the length of partitions 117, a U-shaped arrangement can be employed. The specifics of hood means H will be described below. It should be noted that sealing surfaces 130 extend to end walls 124, if used. Alternatively, where partitions 117 extend to opposing interior faces 126, a sealing surface in the same plane as 130 is extended along interior face 126 of wall 18 on two ends of compartments 118.

The general shape of hood means H is shown in U.S. Pat. No. 4,624,783. In the preferred embodiment, hood means H is a rectangularly shaped enclosure 132, having an opening 134 which is downwardly facing toward compartments 118. The lower periphery of enclosure 132 provides a continuous seal support surface 136. This surface can be of various shapes without departing from the spirit of the invention. As shown in FIG. 1, support surface 136 includes sealing means S mounted continuously thereto. In the preferred embodiment, sealing means S is made of a resilient material that is selectively inflatable by either pneumatic or hydraulic pressure when vertical walls 138 and 140 of enclosure 132 are in alignment with partitions 117. It should be noted that in the preferred embodiment, the partitions are disposed at approximately sixteen to thirty-two inches (16"-32") on center, and openings 107 are approximately at eight-inch (8") centers.

Means well-known in the art can be used to attach sealing means S to support surface 136. Once vertical walls 138 and 140 are placed in alignment with partitions 117, inflation means such as hydraulic or pneumatic pressure source (not shown) can be used to inflate sealing means S to create a sealable contact with sealing surface 130, which runs continuously at the tops of partitions 117 and along end walls 124, if used, or along opposed interior faces 126.

Suction means A is preferably mounted to enclosure 132 on top surface 142. Preferably, suction means A is a pump which can be selectively operated after inflating sealing means S to induce flow from filtrate receiving chamber 122 through nozzles 109 mounted in openings 107, through the media 111 in the compartment 117, which has just been sealed off by sealing means S. The pump 144 can be left running continuously without departing from the spirit of the invention. The induced flow from the filtrate receiving chamber dislodges accumulated impurities filtered out by media 111 and moves such materials through opening 134 into enclosure 132 through pump 144 to a point for disposal or further treatment, indicated generally as 146. While the backwashing step described in the previous sentence is going on, the remainder of the bed 111 is in filtration service. Suitable controls are provided to time the backwash step or to otherwise control its duration for sufficient cleaning of a given compartment 118. At the conclusion of the backwashing, pump 144 is turned off and sealing means S are deflated. The pump 144 can be left running continuously without departing from the spirit of the invention. Optionally, a vacuum breaker (not shown) can be placed on enclosure hood 132 to facilitate equalization of pressure within enclosure hood 132 and its surrounding environment to facilitate the deflation of sealing means S and movement of hood 132. While sealing surfaces 130 and 136 are shown to be continuously flat, other shapes are within the scope of the invention. For example, sealing surfaces 130 and 136 can be slightly curved to the shape of sealing means S to facilitate a greater amount of contact surface upon inflation of sealing means S with the sealing surfaces 130 and 136. Thus, curved, C-shaped or U-shaped sealing surfaces 130 and 136 are also within the purview of the invention. Sealing means S is not necessarily limited to a tubular-shaped resilient material which is capable of changing dimension upon inflation. Sealing means S encompasses any and all resilient materials which will withstand the environment of the materials passing through the filter which have a capability to selectively change dimensions to accomplish a sealing contact while at the same time capable of selectively assuming a second position to permit clearance between the sealing means S and the sealing surfaces 130 and 136.

At times, it may be desirable to completely remove the bed material 111 from the filter F. The proportions of enclosure hood 132 are such that when pump 144 is operated, a flow of backwash fluid is begun through a given compartment 118 to dislodge impurities in the bed material 111. However, the height of partitions 117 and vertical walls 138 and 140 of enclosure 132 are such that sufficient freeboard is provided above the bed 111 so that upon actuation of pump 144, very little, if any, of the bed material 111 is pulled into pump 144. Pump 144, if it is designed to handle solids, can do double duty as a backwash pump and as a pump to remove the bed material 111. In order to do this, a separate suction line can be connected to pump 144 which extends adjacent to media support surface 105 when enclosure 132 is in alignment with partitions 117 in a given compartment 118. Alternatively, one telescoping suction line can be used to selectively backwash or pump out media 111. In order to allow translation means T to move enclosure 132 along track 32, any kind of suction dip pipe connected to pump 144 must be retractable into enclosure hood 132 to avoid coming into contact with partitions 117. Alternatively, a hose which can be selectively retracted can be used. Retraction can occur by means of a hose reel. Alternatively, a second or separate pump from pump 144 can be used which is capable of handling slurries. In normal operation, very few solids would be passed through pump 144 in its primary purpose as a backwash pump. However, if the pump 144 is designed for double duty, it must be capable of handling slurries without adverse effects. As an alternate to using pump 144 to remove bed material 111 from compartments 118, an eductor can be used. The use of an eductor to remove the bed material 111 was disclosed in U.S. Pat. No. 4,624,783. However, that apparatus did not feature compartments 118 created by partitions 117 and, hence, the suction pipe from the eductor was disposed within the hood enclosure, with the hood enclosure actually penetrating the bed down to the media support surface. In the apparatus shown in FIG. 1, any extensions of piping beyond opening 134 would impede the translational movement of enclosure hood 132.

As shown in FIG. 1, track 32 does not extend completely across interior face 126. This is helpful in removing and inserting hood 132 and translation means T attached thereto onto the track 32. Alternatively, track 32 can extend across interior face 126. As shown in FIG. 1, the track position can be below the water level 115, or it can be within the filter F but above the water level 115, or on the top 128 of wall 18. Several advantages can be obtained by locating the track 32 below the water level 115. Those skilled in the art will appreciate that enclosure 132 can be as much as sixteen feet (16') long and perhaps more. This will result in significant weight for enclosure 132. Since the enclosure will have to have some structural integrity, the length involved, coupled with the possibility of locating a pump 144 on the enclosure 132, can mean that the entire assembly has significant weight, all of which will bear on translation means T. While the components of translation means T can be designed to support the entire weight of enclosure 132 and the accessories mounted thereto, it is advantageous to use buoyancy to reduce the loads on translation means T. This will allow the use of smaller components in the assembly comprising translation means T, as well as better mechanical reliability over time.

It should be noted that while pump 144 has been shown to be mounted to top surface 142 of enclosure 132, pump 144 may also be located elsewhere, rigidly mounted to filter F, such as adjacent the top 128 of wall 18. If pump 144 is mounted in a place like the top 128 of the wall 18, the weight on enclosure 132 is reduced. However, the length of suction line 148 and logistics of handling necessarily become longer.

As shown in FIG. 1, the track 32 can be below the waterline 115. The weight bearing on translation means T from the enclosure 132 and equipment such as pump 144 mounted thereon can be adjusted through the use of ballast tanks, shown schematically as 150. The amount of fluid in tanks 150 can be adjusted to regulate the weight supported by translation means T. Alternatively, styrofoam or some type of solid float may be used.

Figure 12:
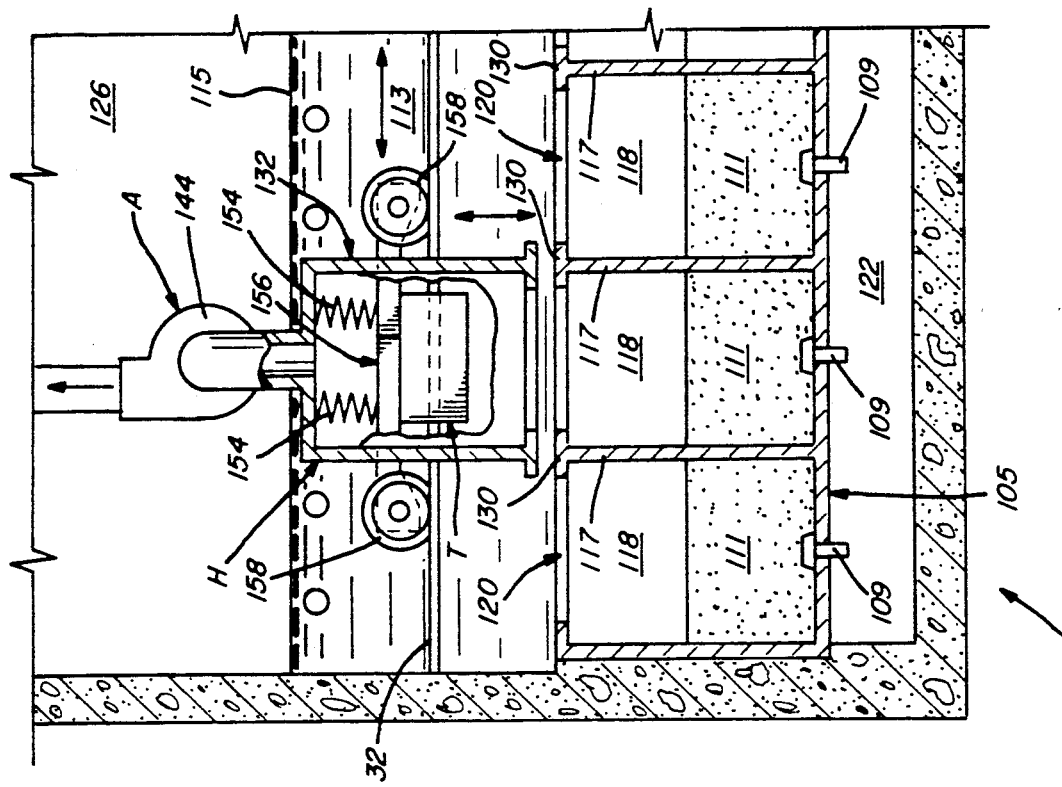
FIG. 12 is a variation of the design shown in FIG. 11.
Figure 11:
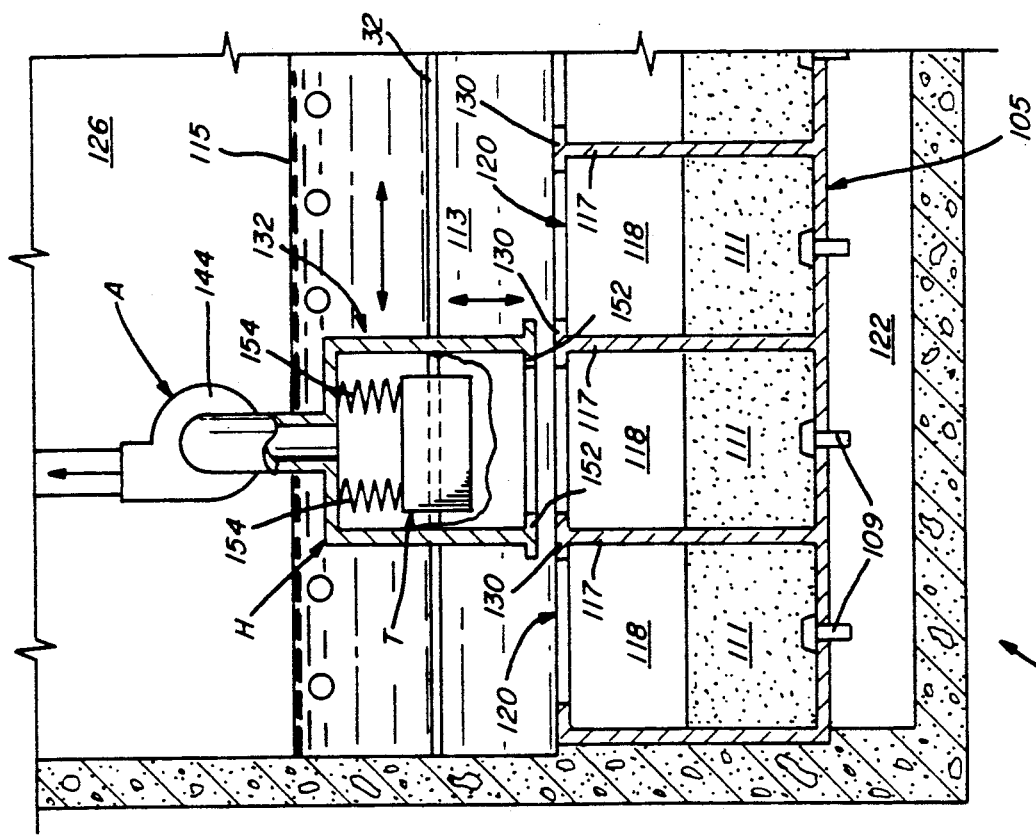
FIG. 11 is a sectional elevational view of the invention, relating specifically to vertical movement of the hood.

An alternative embodiment is shown in FIGS. 11 and 12. In FIG. 11, track 32 is disposed as shown in FIG. 1. Translation means T moves in both directions along track 32. Pump 144 is shown on top of enclosure 132. All of the partitions 117 have sealing surfaces 130 mounted on the top. The difference between the embodiment shown in FIG. 11 as compared to FIG. 1 is that sealing means S is no longer the inflatable-type seal preferably disclosed for use in the embodiment of FIG. 1. Instead, enclosure 132 has a continuous seal support surface 152. Sealing can be accomplished by putting surface 152 in direct contact with surface 130, which circumscribe a compartment 118. Alternatively, a resilient member can be fixedly attached to either sealing surface 130 or sealing surface 152, such that when contact is made, a seal is accomplished. The apparatus in FIG. 11 shows enclosure 132 schematically connected to translation means T. While 154 indicates a pair of springs, FIG. 11 and 12 are intended to be representative of means of connection between the enclosure hood 132 and translation means T. Alternatives such as hydraulic or pneumatic cylinders can be used for means 154. The schematic representation 154 indicates that the connection between translation means T and hood 132 includes some sort of a built-in bias which keeps surface 152 apart from surfaces 130. The operation of the translation means is described in detail below. In all other respects, the movement in translation of the enclosure hood 132 is the same as described for FIG. 1. The difference between FIG. 1 and FIG. 11 is that the hood 132 also moves in a vertical plane as well as in a horizontal plane. It is intended that the biasing means 154 normally retain the hood 132 in a position permitting a clearance between sealing surface 152, or any sealing member mounted thereto, and sealing surface 130, or any sealing member mounted thereto. When it is time to initiate a backwash cycle for a given compartment 118 shown in FIG. 11, the hood 132 has already been placed in alignment with partitions 117. Pump 144 is actuated, which creates a reduced pressure within hood 132. Initially, unfiltered water will pass through the gap between surfaces 130 and 152 and/or any sealing members mounted thereto. Eventually, the reduced pressure will overcome the force of biasing means 154 and draw surface 152 closer to surface 130, effectuating a seal due to the sealing member(s) (not shown) mounted therebetween. It should be noted that a sealing member could be selectively put on surfaces 130, surface 152, or both. However, it will be far more economical to limit the sealing member to surface 152 and have that sealing member come in contact with surface 130. The variations of surfaces 130 described as to FIG. 1 are equally applicable to FIGS. 11 and 12. At the conclusion of the backwashing step, pump 144 is turned off and the builtin forces of the biasing means 154 push from translation means T against enclosure 132, separating surfaces 130 from 152 and breaking the seal. Vacuum breakers (not shown) may also be used at this point to assist in breaking the seal. The hood 132 is then translated by use of translation means T to the next compartment 118, where the process is repeated.

The embodiment shown in FIG. 12 is similar to that shown in FIG. 11, with the exception that translation means T is connected to a cart 156, which has a pair of wheels 158 which preferably ride also on track 32, as does translation means T. The biasing means 154, again shown schematically, indicate a connection between the cart 156 and the hood 132 that allows vertical movement of hood 132 with respect to cart 156. The principle of operation is the same as discussed in FIG. 11. The difference between FIGS. 11 and 12 is that the bulk majority of the weight of the hood 132 and any accessories mounted thereto is absorbed by cart 156 rather than translation means T. It should be noted that a separate track can be provided for wheels 158, but it is more economical to employ the same track or guide for translation means T as cart 156.

Those skilled in the art will appreciate that biasing means 154 can be replaced with a second and similar mechanism as translation means T which, in the case of FIG. 11, operates on a track supported from the first translation means T indicated in the FIGURE. Likewise, in FIG. 12 a second translation means, oriented for vertical movement, can be placed in contact with carriage 156 for selected vertical movement of hood 132. It is also within the purview of the invention to place a sealing means S, such as shown in FIG. 1, in the embodiment shown in FIG. 11 and 12, although in view of the capability of hood 132 to make vertical movements in the embodiment shown in FIGS. 11 and 12, the need to have a sealing means capable of deflation or reduction in dimension is reduced since the hood 132 has capabilities of independently moving in the vertical direction. In the embodiment shown in FIG. 1, only translational movement in a horizontal plane is required since deflation of sealing means S provides enough clearance for hood 132 to be moved in a horizontal plane.

It is sometimes advantageous to lift and scour the bed material 111 in combination with a liquid backwash step for more efficient cleaning. The embodiment of the invention shown in FIG. 13 facilitates cleaning the bed material 111 with a combination of gas to lift and scour (preferably pressurized air) and a liquid backwash step using fluid filtered by filter F.

Figure 13:
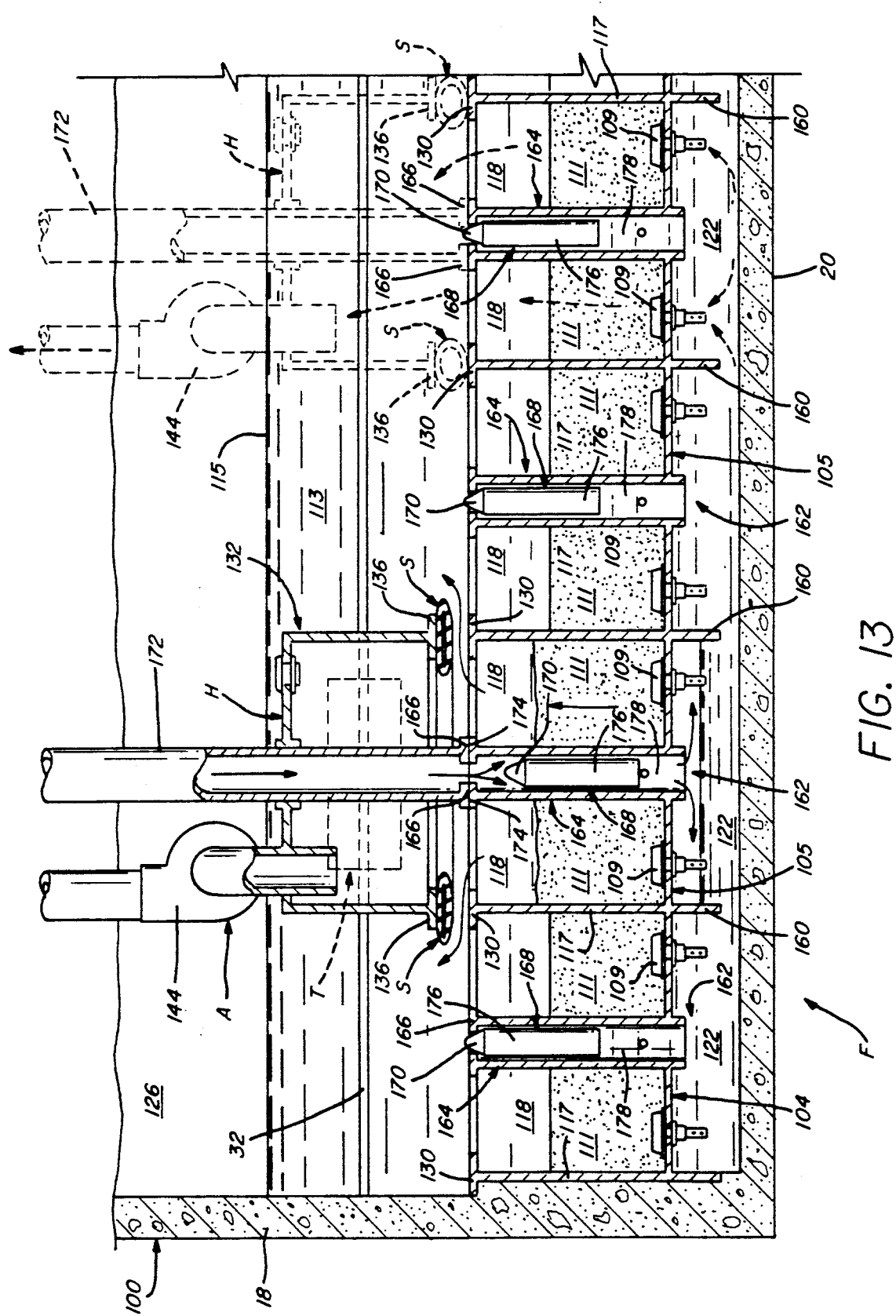
FIG. 13 illustrates the use of the invention to gas scour the media prior to water backwashing.

As shown in FIG. 13, the filter F is divided into compartments 118 which are created through partitions 117. However, there is some difference in the partitions 117 shown in FIG. 13 from those in FIG. 11. As shown in FIG. 13, the partitions 117 have a lower extension 160. This lower extension 160 on each partition 117 creates compartments 162 below media support surface 105. Compartments 162 are in alignment with compartments 118, as shown in FIG. 13. As before, a sealing surface 130 is provided on top of each of the partitions 117. Additionally, the embodiment shown in FIG. 13 includes at least one stack 164. Stack 164 extends through media support surface 105 into filtrate receiving chamber 122. However, the penetration of stack 164 into filtrate receiving chamber 122 is not as great as that of lower extensions 160, thereby placing the lower extremity of stack 164 completely within compartments 162. Located at the top of stack 164 is a sealing surface 166, which preferably is aligned with sealing surfaces 130, but need not necessarily be aligned for the operation of the present invention. Sealing surface 166 also provides a seat for valve 168. As shown in FIG. 13, valve 168 is preferably a float 176 which rides inside of stack 164 with a suitable sealing surface 170 which, due to the buoyancy effects, keeps valve 168 normally closed by pushing surface 170 in contact with a seat created by surface 166. Hood 132 also contains some modifications from the embodiments disclosed in FIGS. 1, 11 and 12. In the preferred embodiment of FIG. 13, hood 132 has a tube 172 mounted for relative movement with respect to hood 132. Tube 172 has a sealing surface 174, which is adapted to contact surface 166 for sealing engagement between the tube 172 and the stack 164.

As before, a track 32 is employed in conjunction with translation means T to move hood 132 in a horizontal plane. Tube 172 is connected to the discharge of a blower/compressor which is sized for aerating one compartment as opposed to the entire filter.

Sealing between surfaces 136 and 130 and between surfaces 174 and 166 can be accomplished in a variety of ways. One way is the absence of any intermediate sealing elements and just using direct contact between the aforesaid surfaces. Another way is to use a resilient sealing member fixedly mounted to surfaces 136 and 174. To do these two options, it may be required to have vertical movement capability to the hood, as described in FIGS. 11 and 12, by example and not by way of limitation. Yet an alternative is to use a resilient sealing member such as sealing means S described in FIG. 1, which is capable of selectively charging dimension, in which case it may be unnecessary to provide for vertical movement for the hood. Sealing means S may optionally be left deflated during air scouring.

Procedurally, it is important to keep in mind that when aerating the bed material 111 prior to backwashing it, it is important to eliminate most of the air induced into the bed material 111 prior to initiating the backwash step. This is important to avoid having entrapped gas work its way through the pump and cause problems with cavitation in the pump. Accordingly, it is desirable to keep surface 136, or any sealing member attached thereto, separated from surfaces 130 during the aeration step to permit the venting of the induced vapor coming from the blower/compressor (not shown) through tube 172 down through stack 164. As shown in FIG. 13, forcing fluid through tube 172 and stack 164 displaces the float 176 downwardly, effectively opening valve 168 and allowing the compressed gas, preferably air, to escape out the bottom 178 of stack 164. Thereafter, due to lower extension 160 of compartments 117, the path of least resistance within compartments 162 after downward displacement of the filtered liquid level is through nozzles 109. Those skilled in the art will readily appreciate that an initial downward displacement of filtered material within compartment 162 occurs prior to sufficient pressure being built up within compartment 162 to force gas through nozzles 109. The gas delivered from stack 164 passes through nozzles 109 and out a gap between surfaces 130 and 136. Of course, during the air scour, surfaces 174 and 166 are in sealable contact, either directly or through a sealing member (not shown). Having completed the air scour step, the source of compressed gas is turned off, which in turn allows float 176 to rise, closing valve 168. Thereafter, it is necessary to seal between surfaces 136 and 130. This can be done by using an inflatable sealing means such as shown in FIG. 1, or some other sealing material which can readily and selectively change dimension, or by lowering hood 132. At that point, while maintaining a seal between surfaces 174 and 166, as well as between 136 and 130, the water backwashing can commence as previously described with regard to FIG. 1. Thereafter, at the conclusion of the backwashing step, sealing contact is broken between surfaces 136 and 130, as well as 174 and 166, and translation means T moves hood 132 along track 32 into alignment with the adjacent compartment 118, or alternatively, any other preselected compartment.

It should be noted that the sealing means S, as shown in FIG. 1, can be applied to surfaces 136 and 174. In operation, sealing means S, applied to surface 174, would be initially inflated for the air lifting and scouring step, with the sealing means S applied to surface 136 deflated to allow for escape of gas. At the conclusion of the air scour step, the sealing means S connected to surface 136 can be inflated to allow the water backwashing to proceed. When it is time to move hood 132, both sealing means S connected to surfaces 136 and 174 can be deflated, thereby allowing sufficient clearance for translation of hood 132 by operating translation means T. In this arrangement, there would be no need for flexible mounting of tube 172 with respect to hood 132. Alternatively, tube 172 can be telescopically mounted to hood 132 so that it normally positions surface 174 beyond surface 136. This construction would require the ability of hood 132 to move in the vertical plane. With this alternative construction, downward movement of hood 132 results in initial contact between surfaces 174 and 166 through any sealing members therebetween or directly. At the completion of the lifting and scouring step using gas, hood 132 is further lowered, bringing surfaces 136 in contact with surface 130 or any sealing members disposed therebetween. Once this position has been achieved, water backwashing may proceed.

The partition walls 117 are designed to retain the media 111 during the lifting and scouring step, it being understood that the level in compartment 118 rises during such step due to the vigorous action of the compressed gas bubbling through the media 111. Similarly, lower extensions 160 are sufficiently long so that the path of least resistance of compressed gas coming through stack 164 after displacing the filtered liquid level is back into the nozzles 109. It is understood that the liquid level within compartment 162 during the air lifting and scouring step is lowered, away from media support surface 105, but is not lowered sufficiently to result in gas escaping the compartment 162. Instead, the gas after initial liquid displacement follows the path of lesser resistance through the nozzles 109. It is understood that in the embodiment disclosed in FIG. 13, in order to effectuate any required vertical movement of hood 132, means similar to translation means T can be employed for the purpose of such vertical movement. As indicated in the discussion with respect to FIG. 1, vacuum-breaking devices can be employed on hood 132 to facilitate in breaking the sealing connection between surfaces 130 and 136 and surfaces 174 and 166.

Pump 144 can be mounted to hood 132 or can be mounted to filter F in a fixed location. In locating pump 144 at a point other than hood 132, a suction line of sufficient length can be provided to allow hood 132 to traverse the entire length of filter F and remain connected to pump 144. Alternatively, a header can be provided with outlets projecting through interior face 126 into each compartment 118. Valves can be selectively operated on each branch of the header to align the individual compartments 118 to pump 144. A short segment of suction line would be mounted to hood 132, which would be movable with hood 132. As hood 132 is aligned above a compartment 118, the suction line 148 would come into alignment with an outlet of the header projecting through interior face 126, thereby allowing a sealable connection to form. The valves which isolate each branch of the suction header can be placed below the water level 115. Alternatively, individual lines can project through interior face 126 with an external header and shut-off valves for each outlet located outside of filter F. This construction takes weight off of hood 132 and translation means T and makes the installation and operation more economical.

Figure 3:
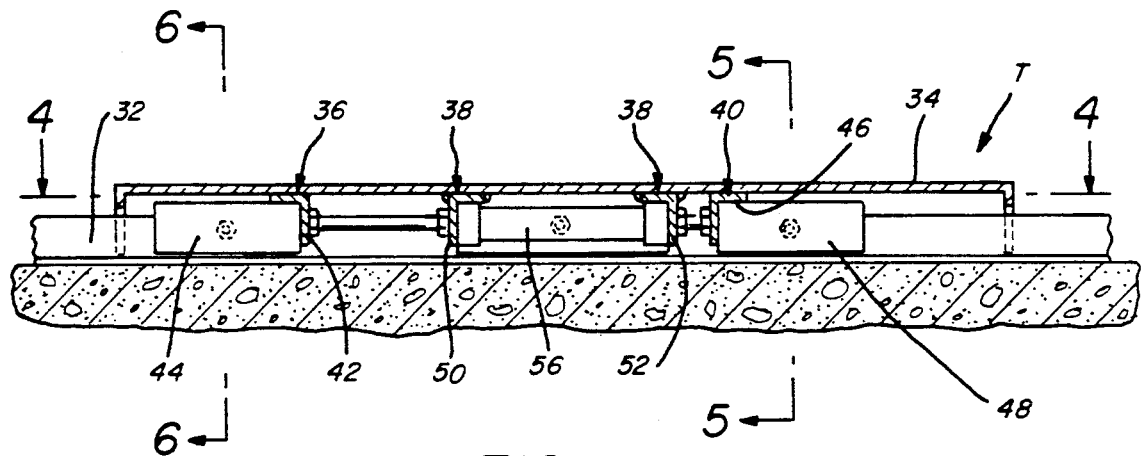
FIG. 3 is a sectional elevational view of the driving apparatus.
Figure 4:
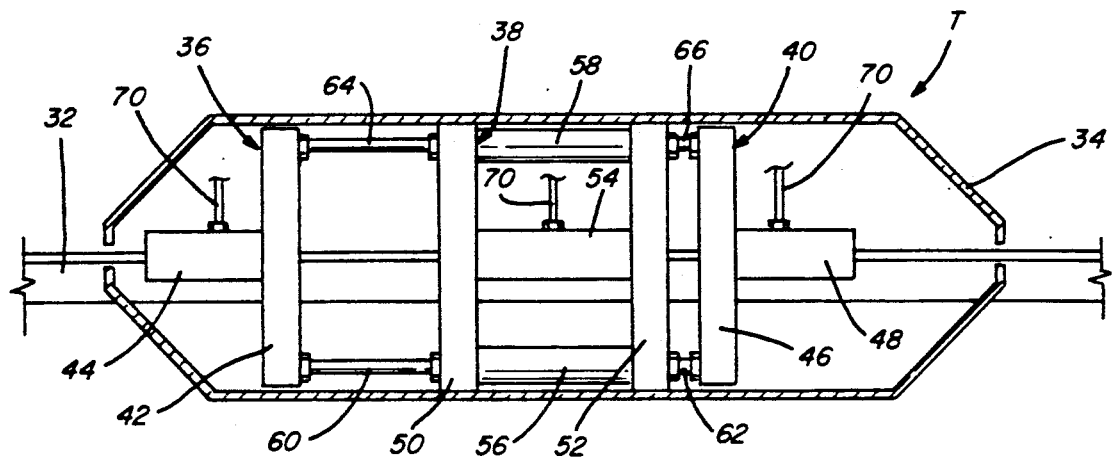
FIG. 4 is a top plan section, taken along line 4—4 of FIG. 3, showing further details of the three body members.

As shown in FIGS. 3 and 4, translation means T further includes a housing 34, first body member 36, second body member 38, and third body member 40. The housing 34 surrounds and contains the three body members 36, 38, and 40. The first body member 36 includes a cross member 42 and a slide member 44 integrally joined to the cross member 42, as seen in FIG. 4. Similarly, the third body member 40 includes a cross member 46 and a slide member 48 integrally joined to the cross member 46. Positioned between first and third body members 36 and 40 is the second body member 38, comprising frame members 50 and 52 and slide member 54. The slide member 54 interconnects the two frame members 50 and 52. The slide members 44 and 48 are connected to the midportions of the cross members 42 and 46, while the slide member 54 is connected to the midportions of frame members 50 and 52.

First body member 36 is joined to second body member 38 by an interconnecting mechanism including a pair of cylinders 56 and 58. First cylinder 56 extends between frame members 50 and 52, and is attached thereto at opposite ends of first cylinder 56. First cylinder 56 has a pair of piston rods 60 and 62. Each piston rod 60 and 62 is retractable within the first cylinder 56, as well as extendable out of an end of first cylinder 56. The outer end of piston rod 60 is fastened to cross member 42 of first body member 36 adjacent a first side of the cross member 42. The outer end of the piston rod 62 is fastened to cross member 46 of second body member 38 adjacent a first side of cross member 46. The inner ends of the piston rods 60 and 62 are connected to a common piston (not shown) contained within first cylinder 56.

Likewise, second cylinder 58 extends between frame members 50 and 52 and is attached to the sides of the frame members 50 and 52, opposite those sides to which first cylinder 56 is connected. The second cylinder 58 has a pair of piston rods 64 and 66. Each piston rod 64 and 66 is retractable within the second cylinder 58, as well as extendable out an end thereof. The outer end of the piston rod 64 is fastened to cross member 42 of first body member 36 adjacent a second side of the cross member 42. The outer end of the piston rod 66 is fastened to cross member 46 adjacent a second side of the cross member 46. The inner ends of the piston rods 64 and 66 are connected to a common piston (not shown) contained within second cylinder 58.

Figure 5:
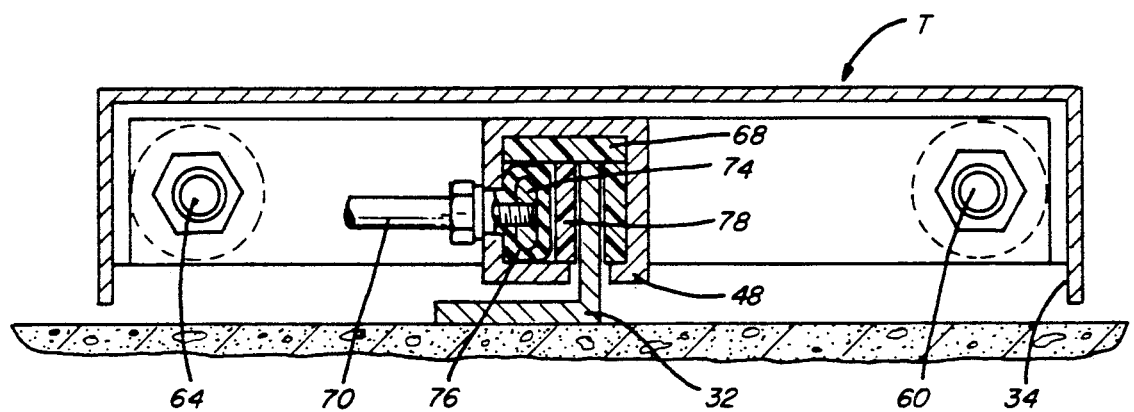
FIG. 5 is an enlarged, fragmentary, lateral section, taken along line 5—5 of FIG. 3, illustrating a clamping member housed within a slide member.
Figure 6:
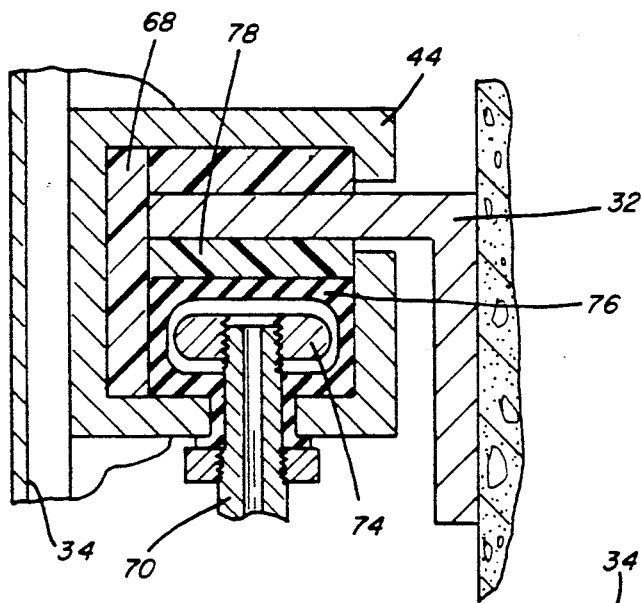
FIG. 6 is a greatly enlarged, fragmentary, lateral section, taken along line 6—6 of FIG. 3, illustrating operation of a clamping member for gripping the track and preventing movement of the third body member.
Figure 7:
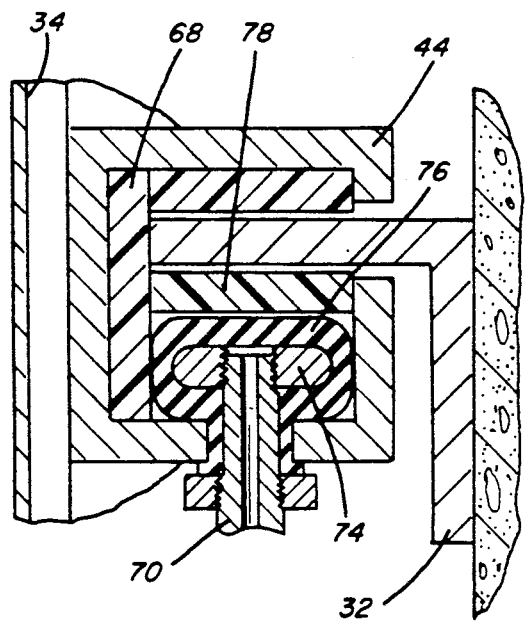
FIG. 7 is a lateral section similar to FIG. 6, showing the clamping member deactivated to permit movement of the third body member.
Figure 8:
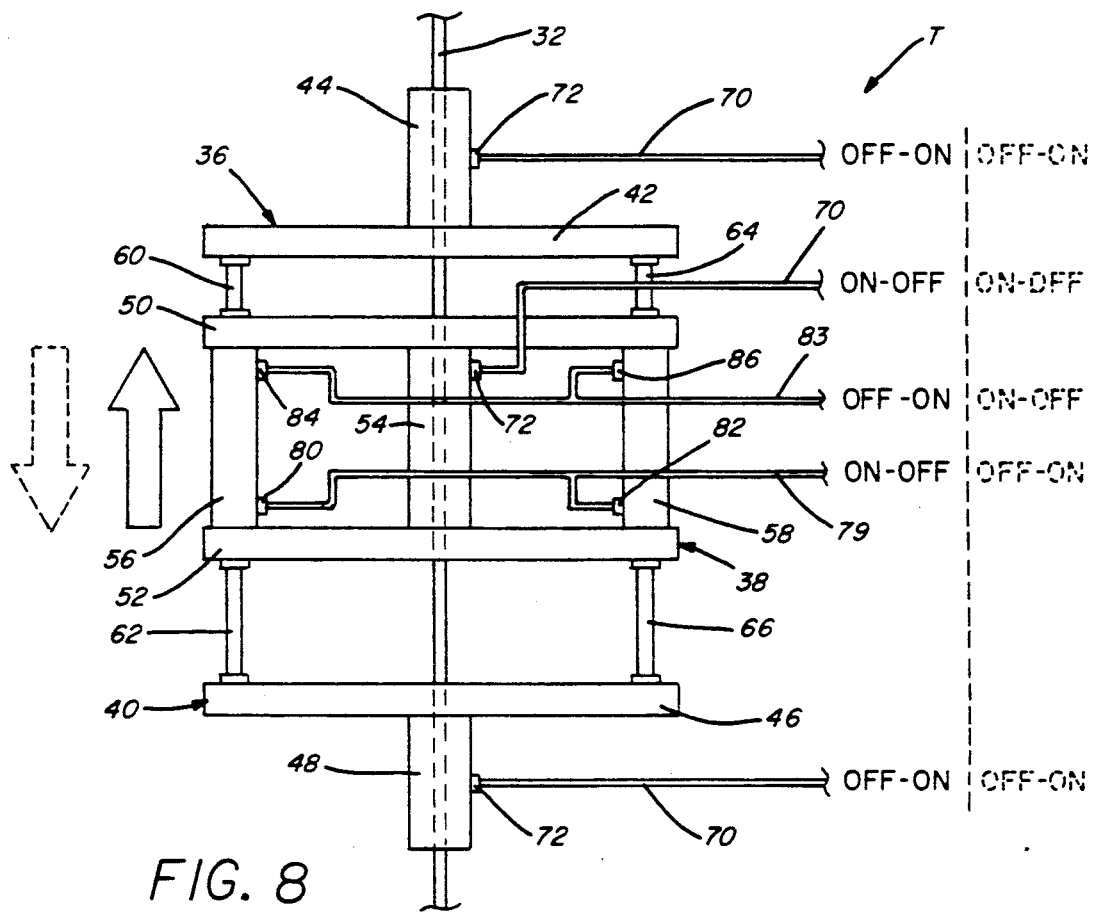
FIG. 8 is a top plan diagrammatic view of the three body members, illustrating movement thereof depending upon the application of pressurized fluids.

Fixably fitted within the hollow interior of each of the slide members 44, 48 and 54 is a contact member 68, which the track 32 engages as the translation means T moves along the track 32. The contact member 68 contained within slide member 44 is depicted in FIG. 5 while the contact member 68 of third body member 40 is shown in FIGS. 6 and 7. The contact member 68 is typically made of a strong plastic and is held against two of the inner walls of a slide member. Securely connected to each slide member 44, 48 and 54 is also a pressure brake line 70 which is received in a brake opening 72 formed in each slide member 44 48 and 54, as represented in FIG. 8. The pressure brake line 70 carries pressurized fluid to its corresponding brake opening 72, as will be subsequently discussed. Each pressure brake line 70 is of sufficient length so that the assembly is movable along the entire extent of the track 32.

In addition, a track clamping mechanism is positioned within each slide member 44, 48 and 54. Each clamping mechanism includes a rigid, generally rectangular bar 74 surrounded by a diaphragm 76. The bar 74 has a threaded opening. Correspondingly, the diaphragm 76 has an opening aligned or coaxial with the bar opening. A threaded end of the pressure brake line 70 is tightly held in the threaded bar opening to connect the pressure brake line 70 to the clamping mechanism.

The clamping mechanism further includes a brake pad 78 held adjacent the diaphragm 76 within each slide member 44, 48 and 54 for engagement with the diaphragm 76. The pressure brake line carries pressurized fluid so that the fluid can exit into the diaphragm 76. As illustrated in FIG. 6, pressurized fluid is contained in the diaphragm 76. As a result, the diaphragm 76 expands and pushes against the brake pad 78. In turn, the brake pad 78 engages the track 32 so that the slide member 48 is thereby clamped or braked on the track 32, for purposes to be discussed later. FIG. 7 illustrates the workings of the clamping mechanism when the pressurized fluid is no longer present in the diaphragm 76. As can be seen, the track 32 is no longer clamped between the brake pad 78 and the contact member 68. Consequently, the slide member 48 is free to move along the track 32 when the translation means T is driven.

The operation of the sediment-translation means T is illustrated diagrammatically in FIG. 8. As stated previously, the device is capable of a reciprocating, stepping movement. A description of the stepping movement in a first direction (illustrated by the solid line arrow of FIG. 8) is given first. For explanation purposes, it is assumed that the first body member 36 is immediately adjacent second body member 38 so that the piston rods 60 and 64 are retracted within first cylinder 56 and second cylinder 58, respectively. In order to move first body member 36 away from second body member 38 or in the direction illustrated by the solid line arrow, no pressurized fluid is provided to the clamping mechanisms of slide member 44 and 48. The clamping mechanism of slide member 54 is then activated by providing pressurized fluid through pressure brake line 70 and brake opening 72 to the diaphragm 76 housed therein.

As a result, the second body member 38 is held fixed or braked upon the track 32. Next, pressurized fluid is provided to both first and second cylinders 56 and 58 through pressure drive line 79 and drive openings 80 and 82. Pressure drive line 79 carries pressurized fluid to the cylinders 56 and 58 for use in driving the device. Drive openings 80 and 82 are formed in the cylinders 56 and 58 at first ends thereof adjacent frame member 52 of second body member 38. The pressurized fluid against the pistons within the cylinders 56 and 58 forces the piston rods 60 and 64 outwardly of the cylinders 56 and 58, while the second body member is held fixed to thereby move or slide first body member 36 along the track 32 relative to and away from the second body member 38. Since piston rods 62 and 66 are connected to the common piston to which piston rods 60 and 64 are also connected, third body member 40 moves in a direction towards second body member 38.

After the piston rods 60 and 64 have reached their fullest outer extent with respect to the second body member 38 or where third body member 40 is immediately adjacent second body member 36, the clamping mechanisms of slide members 44 and 48 are activated by means of the application of pressurized fluid thereto through their respective pressure brake lines 70 and brake openings 72. The clamping mechanism of slide member 54 is released. Next, pressurized fluid is provided to both cylinders 56 and 58 through drive line 83 and drive openings 84 and 86. Pressure drive line 82 carries pressurized fluid to the cylinders 56 and 58 for use in driving the device. Drive openings 84 and 86 are formed in the cylinders 56 and 58 at second ends thereof adjacent frame member 58 of second body member 38. The pressurized fluid against the pistons in the cylinders 56 and 58 through these drive openings 84 and 86, while first body member 36 and third body member 40 are clamped to the track 32, results in a force which pulls second body member 38 in the direction of the first body member 36 to retract piston rods 60 and 64 within their respective cylinders 56 and 58, while moving second body member 38 along the track 32 relative to and towards first body member 36. Second body member 38 moves until it contacts first body member 36. The piston rods 62 and 66, connected to third body m ember 40, are extended outwardly from their respective cylinder ends during this movement of the second body member 38.

After the second body member 38 is immediately adjacent the first body member 36, that is to say, the piston rods 60 and 64 are retracted within the cylinders 56 and 58, the foregoing process just described is repeated. The movement of the translation means T in the first direction continues for a predetermined time, normally, until the translation means T reaches a wall of the vessel 16. In order to move the translation means T in a second direction, opposite the just described first direction, a similar operation is used. Assuming that second body member 38 is immediately adjacent first body member 36 and first body member 36 is essentially adjacent the vessel wall, the clamping mechanisms of slide member 44 and 48 are activated to hold first and third body members 36 and 48 fixed to the track 32 Pressurized fluid is removed from the clamping mechanism of the second body member 38. Pressurized fluid is then provided through pressure drive line 79 and drive openings 80 and 82 to the first and second cylinders 56 and 58. The force against the piston in the two cylinders 56 and 58 moves the second body member 38 along the track 32 in a second direction or towards third body member 40.

After second body member 33 is moved immediately adjacent third body member 40, the clamping mechanisms of slide members 44 and 48 are disengaged by removal of the pressurized fluid applied thereto. The clamping mechanism of slide member 54 is activated by means of pressurized fluid. Subsequently, pressurized fluid is provided through pressure drive line 83 and drive openings 84 and 86 of first and second cylinders 56 and 58. Force of the fluid moves the piston rods 62 and 66 outwardly of the cylinders 56 and 58 while piston rods 60 and 64 are retracted within the cylinders 56 and 58.

After the piston rods 62 and 66 have reached their fullest outer extent with respect to the second body member 38 or where first body member 36 is immediately adjacent second body member 38, the foregoing described process is repeated until the translation means T is moved for a predetermined time in the second direction.

The state or condition of the pressurized fluid sent to the slide members 44, 48 and 54 and cylinders 56 and 58 for proper working operation of the device is provided adjacent the pressure brake lines 70 and pressure drive lines 79 and 83 depicted in FIG. 8. ON indicates that pressurized fluid is being applied, while OFF indicates that pressurized fluid is not being applied. The first column of the first pair of columns represents the state of the pressurized fluid when the first body member 36 and the third body member 40 are being moved in the first direction (solid line arrow). The second column of the first pair of columns represents the state of the pressurized fluid when the second body member 38 is being moved in the first direction (solid line arrow).

The first column of the second pair of columns represents the state of the pressurized fluid when the third body member 40 and first body member 36 are being moved in the second direction (dotted line arrow). The second column of the second pair of columns represents the state of the pressurized fluid when the second body member 38 is being moved in the second direction (dotted line arrow).

Figure 9:
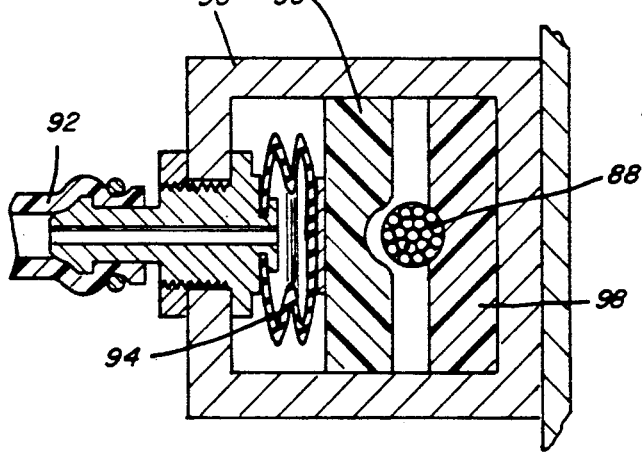
FIG. 9 is a lateral section showing another embodiment for clamping a body member by gripping a cable along which the body member moves.
Figure 10:
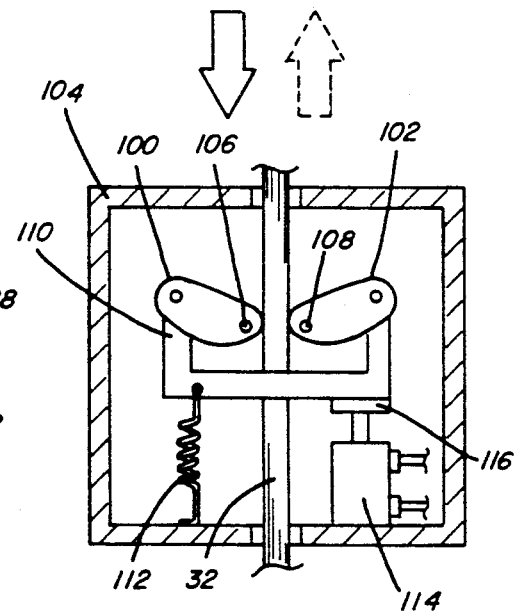
FIG. 10 is a top plan section of another embodiment for clamping a body member to a track.

Referring to FIGS. 9 and 10, different embodiments of the clamping mechanism of the present invention are provided. In FIG. 9, a cable 88 is substituted for the track 32. Unlike the slide members 44, 48 and 54, slide member 98 has no opening formed at its bottom to receive a track 32. The cable is supported above the vessel floor 20 to be received within the hollow interior of the slide member 90. Pressure brake line 92 is connected to the slide member 90 and carries pressurized fluid to a bellows 94. Upon delivery of pressurized fluid, the bellows 94 expands and forces brake show 96 against the cable 88. The cable 88 then also engages brake shoe 98 sc that slide member 90 is clamped to the cable 88. In the absence of pressurized fluid, the bellows 94 retracts and slide member 90 is no longer clamped to the cable 88 and is capable of movement therealong.

The clamping mechanism embodied in FIG. 10 includes a pair of cams 100 and 102 connected to a slide member 104 for pivotal movement about pivot pins 106 and 108, respectively. The cams 100 and 102 are positioned on opposite sides of the bottom opening of the slide member 104. The cams 100 and 102 are joined together by an interconnecting piece 110. A spring 112 attached to the interconnecting piece 110 urges the cams 100 and 102 toward the track 32. A solenoid 114 having a solenoid head 116 is positioned within the slide member 104 so that the solenoid head 116 can engage the interconnecting piece 110 when the solenoid 114 is energized.

In operation, the slide member 104 is capable of movement in the direction identified by the solid line arrow of FIG. 10. However, the slide member 104 cannot move in the direction of the phantom or dotted line arrow inasmuch as the cams 100 and 102 grip the track 32 when the slide member 104 is attempted to be moved in that direction. Once it is desirable to move the slide member 104 in the direction of the phantom line arrow, the solenoid 114 is energized so that the solenoid head 116 drives the interconnecting piece 110 and the cams 102 and 102 pivot in a counterclockwise direction away from the track 32.

The foregoing disclosure and description of the invention are illustrative and explanatory thereof, and various changes in the size, shape and materials, as well as in the details of the illustrated construction, may be made without departing from the spirit of the invention.

We claim:

1. An apparatus for cleaning a liquid filter which contains media supported on a porous support surface, the filter media being segregated into discrete compartments by a plurality of partitions extending from the support surface, the liquid covering said partitions, said apparatus comprising:
   hood means defining an opening, said opening substantially taking the shape of at least one compartment;
   sealing means operable in conjunction with said hood means adapted to selectively engage partitions forming at least one compartment, to seal it off;
   said hood means disposed at least in part in the liquid during movement;
   means for selectively translating said hood means to position it adjacent each compartment, said translating means further comprising drive means located at least in part in said liquid to move said hood means through the liquid to align said hood means to reduce the force required at said translation means to support said hood means.

2. The apparatus of claim 1, wherein said translating means moves said hood means solely in one plane and in a stepwise manner by virtue of movement of a portion of said drive means with respect to another portion of said drive means.

3. The apparatus of claim 1, wherein said sealing means is a tubular resilient member for selective inflation into sealing engagement with partitions defining at least one compartment, said sealing means selectively disposed at a clearance distance from the partitions when selectively deflated to allow said translation means to move said hood means.

4. The apparatus of claim 3, wherein said drive means further comprises:
   a first body member;
   a second body member connected to said first body member;
   a third body member connected to said second body member;
   first means for connecting said first body member to said second body member, at least portions of said first means being extendable relative to said second body member in a first direction to move said first body member relative to said second body member; and
   second means for connecting said second body member to said third body member, at least portions of said second means being extendable relative to said second body member in a second direction to move said third body member relative to said second body member.

5. The apparatus of claim 4, wherein:
   said translation is defined by the movement of said first and third body members relative to said second body member.

6. The apparatus of claim 4, wherein:
   said translation is defined by the movement of said second body member relative to said first and third body members.

7. The apparatus of claim 4, wherein:
   at least portions of said first means is retractable with respect to said second body member to move said second body member relative to said first body member.

8. The apparatus of claim 7, wherein said first means comprises:
   cylinder means having opposing ends and connected to said second body member, said cylinder means having an opening adjacent each of said ends for receiving a pressurized fluid;
   rod means connected to each of said ends of said cylinder means for reciprocating movement inwardly and outwardly of said cylinder means; and
   piston means within said cylinder means and connected to each of said rod means so that, when pressurized fluid is provided to said cylinder means through at least one of said cylinder means openings, said piston means and said rod means are driven in a predetermined direction.

9. The apparatus of claim 8, wherein said translation means comprises:
   braking means for preventing movement of a portion of said drive means with respect to another portion of said drive means; and
   at least one track or cable located on the filter along which the apparatus moves.

10. The apparatus of claim 9, wherein said sealing means is a tubular resilient member for selective inflation into sealing engagement with partitions defining at least one compartment, said sealing means selectively disposed at a clearance distance from the partitions when selectively deflated to allow said translation means to move said hood means.

11. The apparatus of claim 10, wherein said clamping means comprises:
    a bar having an opening;
    a diaphragm surrounding said bar and having an opening aligned with said bar opening; and
    a brake pad adjacent said diaphragm which engages said track or cable to prevent movement of said portions of said second means whenever a pressurized fluid is provided to said diaphragm through said opening thereof.

12. The apparatus of claim 10, wherein said drive means further comprises:
    a pair of pivotally connected cams, said cams positioned on opposite sides of said track or cable to selectively permit movement of said hood in one direction but to prevent movement thereon in an opposite direction.

13. The apparatus of claim 10, further comprising:
    a first body member including a slide member positioned on the track, said slide member having an opening to receive a pressure brake line for carrying pressurized fluid, said first body member further including clamping means connected to said pressure brake line;

a second body member including a slide member positioned on the track, said slide member having an opening to receive a pressure brake line for carrying pressurized fluid, said second body member further including clamping means connected to said pressure brake line;

a third body member including a slide member positioned on the track, said slide member having an opening to receive a pressure brake line for carrying pressurized fluid, said third body member further including clamping means connected to said pressure brake line;

a first cylinder having two ends and being fastened to said second body member and a second cylinder having two ends and being fastened to said second body member, each of said first and second cylinders having a pair of openings adjacent said ends of said first and second cylinders, each of said first and second cylinder openings receiving pressure drive lines for carrying pressurized fluid, said first body member being moved relative to said second body member after pressurized fluid is provided to said second body member clamping means through said pressure brake line thereof and when pressurized fluid is provided through one of said pressure drive lines to said first and second cylinder openings located adjacent said third body member.

14. The apparatus of claim 9, wherein said drive means comprises:

clamping means for receiving a pressurized fluid, said clamping means being held in said drive means and changing in volume to clamp portions of said drive means against the track or cable to prevent movement of said portions of said drive means.

15. The apparatus of claim 14, wherein said clamping means further comprises:

a bellows having an opening for receiving a pressurized fluid, upon receipt of said pressurized fluid, said bellows changing in volume for use in preventing movement of said portions of said second means.

16. The apparatus of claim 1, wherein said translation means comprises:

braking means for preventing movement of a portion of said drive means with respect to another portion of said drive means; and at least one track or cable located on the filter along which the apparatus moves.

17. The apparatus of claim 16, wherein said sealing means is a tubular resilient member for selective inflation into sealing engagement with partitions defining at least one compartment, said sealing means selectively disposed at a clearance distance from the partitions when selectively deflated to allow said translation means to move said hood means.

18. The apparatus of claim 17, wherein said drive means comprises:

clamping means for receiving a pressurized fluid, said clamping means being held in said drive means and changing in volume to clamp portions of said drive means against the track or cable to prevent movement of said portions of said drive means.

19. The apparatus of claim 18, wherein said clamping means comprises:

a bar having an opening;

a diaphragm surrounding said bar and having an opening aligned with said bar opening; and a brake pad adjacent said diaphragm which engages said track or cable to prevent movement of said portions of said second means whenever a pressurized fluid is provided to said diaphragm through said opening thereof.

20. The apparatus of claim 18, wherein said clamping means further comprises:

a bellows having an opening for receiving a pressurized fluid, upon receipt of said pressurized fluid, said bellows changing in volume for use in preventing movement of said portions of said second means.

21. The apparatus of claim 17, wherein said drive means further comprises:

a pair of pivotally connected cams, said cams positioned on opposite sides of said track or cable to selectively permit movement of said hood in one direction but to prevent movement thereon in an opposite direction.

22. The apparatus of claim 17, further comprising:

a first body member including a slide member positioned on the track, said slide member having an opening to receive a pressure brake line for carrying pressurized fluid, said first body member further including clamping means connected to said pressure brake line;

a second body member including a slide member positioned on the track, said slide member having an opening to receive a pressure brake line for carrying pressurized fluid, said second body member further including clamping means connected to said pressure brake line;

a third body member including a slide member positioned on the track, said slide member having an opening to receive a pressure brake line for carrying pressurized fluid, said third body member further including clamping means connected to said pressure brake line;

a first cylinder having two ends and being fastened to said second body member and a second cylinder having two ends and being fastened to said second body member, each of said first and second cylinders having a pair of openings adjacent said ends of said first and second cylinders, each of said first and second cylinder openings receiving pressure drive lines for carrying pressurized fluid, said first body member being moved relative to said second body member after pressurized fluid is provided to said second body member clamping means through said pressure brake line thereof and when pressurized fluid is provided through one of said pressure drive lines to said first and second cylinder openings located adjacent said third body member.

23. The apparatus of claim 17, wherein:

said track is mounted inside the filter adjacent the media;

said hood further comprises ballast means for reducing the weight of the hood which would otherwise bear on said drive means.

24. The apparatus of claim 1, wherein:

said drive means is located within the filter adjacent the media;

said hood further comprises ballast means for reducing the load which would otherwise be imposed on said drive means by said hood.

25. The apparatus of claim 1, wherein:
said translation means selectively moves said hood means in at least two planes.

26. The apparatus of claim 25, wherein said translating means further comprises:
drive means to move said hood means in a stepwise manner in at least two planes by virtue of movement of a portion of said drive means with respect to another portion of said drive means.

27. The apparatus of claim 25, wherein said translating means further comprises:
biasing means connected to said hood means to selectively raise and lower said hood means into proximity of at least one compartment.

28. The apparatus of claim 27, further comprising:
suction means in fluid communication with said hood means for selective reduction of pressure within said hood means, said reduced pressure within said hood means overcoming said biasing means to selectively bring said sealing means in contact with partitions forming at least one compartment.

29. The apparatus of claim 27, wherein said translation means further comprises:
at least one track mounted to the filter;
a support platform mounted to said track and adapted to translate along said track;
said biasing means mounted between said hood and said platform.

30. The apparatus of claim 27, wherein said translation means further comprises:
a first body member;
a second body member connected to said first body member;
a third body member connected to said second body member;
first means for connecting said first body member to said second body member, at least portions of said first means being extendable relative to said second body member in a first direction to move said first body member relative to said second body member; and
second means for connecting said second body member to said third body member, at least portions of said second means being extendable relative to said second body member in a second direction to move said third body member relative to said second body member.

31. The apparatus of claim 30, wherein:
said translation is defined by the movement of said first and third body members relative to said second body member.

32. The apparatus of claim 30, wherein:
said translation is defined by the movement of said second body member relative to said first and third body members.

33. The apparatus of claim 30, wherein:
at least portions of said first means is retractable with respect to said second body member to move said second body member relative to said first body member.

34. The apparatus of claim 33, wherein said first means comprises:
cylinder means having opposing ends and connected to said second body member, said cylinder means having an opening adjacent each of said ends for receiving a pressurized fluid;
rod means connected to each of said ends of said cylinder means for reciprocating movement inwardly and outwardly of said cylinder means; and
piston means within said cylinder means and connected to each of said rod means so that, when pressurized fluid is provided to said cylinder means through at least one of said cylinder means openings, said piston means and said rod means are driven in a predetermined direction.

35. The apparatus of claim 27, wherein said translation means comprises:
braking means for preventing movement of a portion of said drive means with respect to another portion of said drive means; and
a track or cable located on the filter along which the apparatus moves.

36. The apparatus of claim 35, wherein said drive means comprises:
clamping means for receiving a pressurized fluid, said clamping means being held in said drive means and changing in volume to clamp portions of said drive means against the track or cable to prevent movement of said portions of said drive means.

37. The apparatus of claim 36, wherein said clamping means comprises:
a bar having an opening;
a diaphragm surrounding said bar and having an opening aligned with said bar opening; and
a brake pad adjacent said diaphragm which engages said track or cable to prevent movement of said portions of said second means whenever a pressurized fluid is provided to said diaphragm through said opening thereof.

38. The apparatus of claim 36, wherein said clamping means further comprises:
a bellows having an opening for receiving a pressurized fluid, upon receipt of said pressurized fluid, said bellows changing in volume for use in preventing movement of said portions of said second means.

39. The apparatus of claim 35, wherein said drive means further comprises:
a pair of pivotally connected cams, said cams positioned on opposite sides of said track or cable to selectively permit movement of said hood in one direction but to prevent movement thereon in an opposite direction.

40. The apparatus of claim 35, further comprising:
a first body member including a slide member positioned on the track, said slide member having an opening to receive a pressure brake line for carrying pressurized fluid, said first body member further including clamping means connected to said pressure brake line;
a second body member including a slide member positioned on the track, said slide member having an opening to receive a pressure brake line for carrying pressurized fluid, said second body member further including clamping means connected to said pressure brake line;
a third body member including a slide member positioned on the track, said slide member having an opening to receive a pressure brake line for carrying pressurized fluid, said third body member further including clamping means connected to said pressure brake line;
a first cylinder having two ends and being fastened to said second body member and a second cylinder having two ends and being fastened to said second body member, each of said first and second cylinders having a pair of openings adjacent said ends of said first and second cylinders, each of said first and second cylinder openings receiving pressure drive lines for carrying pressurized fluid, said first body member being moved relative to said second body member after pressurized fluid is provided to said second body member clamping means through said pressure brake line thereof and when pressurized fluid is provided through one of said pressure drive lines to said first and second cylinder openings located adjacent said third body member.

41. A liquid filter apparatus, comprising:
an enclosure;
a media support surface having a plurality of openings thereon;
a plurality of partitions covered by the liquid extending from said media support surface above said media support surface creating discrete compartments, said openings disposed between said partitions, allowing fluid communication through said media support surface;
hood means defining an opening, said opening substantially taking the shape of at least one compartment;
sealing means on said hood means adapted to selectively engage partitions forming at least one compartment, to seal it off;
said hood means disposed at least in part in the liquid during movement;
means for selectively translating said hood to position it adjacent each compartment, said translating means further comprising drive means located at least in part in said liquid to move said hood means through the liquid to align said hood means with the compartments, with the liquid exerting a buoyant force on said hood means to reduce the force required at said translation means to support said hood means.

42. The apparatus of claim 41, wherein said sealing means is a tubular resilient member for selective inflation into sealing engagement with partitions defining at least one compartment, said sealing means selectively disposed at a clearance distance from the partitions when selectively deflated to allow said translation means to move said hood means and in a stepwise manner by virtue of movement of a portion of said drive means with respect to another portion of said drive means.

43. The apparatus of claim 42, wherein said drive means further comprises:
a first body member;
a second body member connected to said first body member;
a third body member connected to said second body member;
first means for connecting said first body member to said second body member, at least portions of said first means being extendable relative to said second body member in a first direction to move said first body member relative to said second body member; and
second means for connecting said second body member to said third body member, at least portions of said second means being extendable relative to said second body member in a second direction to move said third body member relative to said second body member.

44. The apparatus of claim 43, wherein:
said translation is defined by the movement of said first and third body members relative to said second body member.

45. The apparatus of claim 43, wherein:
said translation is defined by the movement of said second body member relative to said first and third body members.

46. The apparatus of claim 43, wherein:
at least portions of said first means is retractable with respect to said second body member to move said second body member relative to said first body member.

47. The apparatus of claim 46, wherein said first means comprises:
cylinder means having opposing ends and connected to said second body member, said cylinder means having an opening adjacent each of said ends for receiving a pressurized fluid;
rod means connected to each of said ends of said cylinder means for reciprocating movement inwardly and outwardly of said cylinder means; and
piston means within said cylinder means and connected to each of said rod means so that, when pressurized fluid is provided to said cylinder means through at least one of said cylinder means openings, said piston means and said rod means are driven in a predetermined direction.

48. The apparatus of claim 47, wherein said translation means comprises:
braking means for preventing movement of a portion of said drive means with respect to another portion of said drive means; and
at least one track or cable located on the filter along which the apparatus moves.

49. The apparatus of claim 48, wherein said sealing means is a tubular resilient member for selective inflation into sealing engagement with partitions defining at least one compartment, said sealing means selectively disposed at a clearance distance from the partitions when selectively deflated to allow said translation means to move said hood means.

50. The apparatus of claim 49, wherein said drive means comprises:
sure drive lines to said first and second cylinder openings located adjacent said third body member.

51. The apparatus of claim 50, wherein said clamping means comprises:
a bar having an opening;
a diaphragm surrounding said bar and having an opening aligned with said bar opening; and
a brake pad adjacent said diaphragm which engages said track or cable to prevent movement of said portions of said second means whenever a pressurized fluid is provided to said diaphragm through said opening thereof.

52. The apparatus of claim 50, wherein said clamping means further comprises:
a bellows having an opening for receiving a pressurized fluid, upon receipt of said pressurized fluid, said bellows changing in volume for use in preventing movement of said portions of said second means.

53. The apparatus of claim 49, wherein said drive means further comprises:

a pair of pivotally connected cams, said cams positioned on opposite sides of said track or cable to selectively permit movement of said hood in one direction but to prevent movement thereon in an opposite direction.

54. The apparatus of claim 48, further comprising:
a first body member including a slide member positioned on the track, said slide member having an opening to receive a pressure brake line for carrying pressurized fluid, said first body member further including clamping means connected to said pressure brake line;
a second body member including a slide member positioned on the track, said slide member having an opening to receive a pressure brake line for carrying pressurized fluid, said second body member further including clamping means connected to said pressure brake line;
a third body member including a slide member positioned on the track, said slide member having an opening to receive a pressure brake line for carrying pressurized fluid, said third body member further including clamping means connected to said pressure brake line;
a first cylinder having two ends and being fastened to said second body member and a second cylinder having two ends and being fastened to said second body member, each of said first and second cylinders having a pair of openings adjacent said ends of said first and second cylinders, each of said first and second cylinder openings receiving pressure drive lines for carrying pressurized fluid, said first body member being moved relative to said second body member after pressurized fluid is provided to said second body member clamping means through said pressure brake line thereof and when pressurized fluid is provided through one of said pressure drive lines to said first and second cylinder openings located adjacent said third body member.

55. The apparatus of claim 41, wherein said translation means comprises:
braking means for preventing movement of a portion of said drive means with respect to another portion of said drive means; and
at least one track or cable located on the filter along which the apparatus moves.

56. The apparatus of claim 55, wherein said sealing means is a tubular resilient member for selective inflation into sealing engagement with partitions defining at least one compartment, said sealing means selectively disposed at a clearance distance from the partitions when selectively deflated to allow said translation means to move said hood means.

57. The apparatus of claim 56, wherein said drive means comprises:
clamping means for receiving a pressurized fluid, said clamping means being held in said drive means and changing in volume to clamp portions of said drive means against the track or cable to prevent movement of said portions of said drive means.

58. The apparatus of claim 57, wherein said clamping means comprises:
a bar having an opening;
a diaphragm surrounding said bar and having an opening aligned with said bar opening; and
a brake pad adjacent said diaphragm which engages said track or cable to prevent movement of said portions of said second means whenever a pressurized fluid is provided to said diaphragm through said opening thereof.

59. The apparatus of claim 57, wherein said clamping means further comprises:
a bellows having an opening for receiving a pressurized fluid, upon receipt of said pressurized fluid, said bellows changing in volume for use in preventing movement of said portions of said second means.

60. The apparatus of claim 56, wherein said drive means further comprises:
a pair of pivotally connected cams, said cams positioned on opposite sides of said track or cable to selectively permit movement of said hood in one direction but to prevent movement thereon in an opposite direction.

61. The apparatus of claim 56, further comprising:
a first body member including a slide member positioned on the track, said slide member having an opening to receive a pressure brake line for carrying pressurized fluid, said first body member further including clamping means connected to said pressure brake line;
a second body member including a slide member positioned on the track, said slide member having an opening to receive a pressure brake line for carrying pressurized fluid, said second body member further including clamping means connected to said pressure brake line;
a third body member including a slide member positioned on the track, said slide member having an opening to receive a pressure brake line for carrying pressurized fluid, said third body member further including clamping means connected to said pressure brake line;
a first cylinder having two ends and being fastened to said second body member and a second cylinder having two ends and being fastened to said second body member, each of said first and second cylinders having a pair of openings adjacent said ends of said first and second cylinders, each of said first and second cylinder openings receiving pressure drive lines for carrying pressurized fluid, said first body member being moved relative to said second body member after pressurized fluid is provided to said second body member clamping means through said pressure brake line thereof and when pressurized fluid is provided through one of said pressure drive lines to said first and second cylinder openings located adjacent said third body member.

62. The apparatus of claim 56, wherein:
said track is mounted inside the filter adjacent the media;
said hood further comprises ballast means for reducing the weight of the hood which would otherwise bear on said drive means.

63. The apparatus of claim 41, wherein:
said drive means is located within the filter adjacent the media;
said hood further comprises ballast means for reducing the load which would otherwise be imposed on said drive means by said hood.

64. An apparatus for cleaning a liquid filter which contains media supported on a porous support surface, the filter media being segregated into discrete compartments by a plurality of partitions covered by the liquid extending from the support surface, said apparatus comprising:

hood means defining an opening, said opening substantially taking the shape of at least one compartment;

said hood means disposed at least in part in the liquid during movement;

means for selectively translating said hood means to position it adjacent each compartment, said translating means further comprising drive means located at least in part in said liquid to move said hood means through the liquid to align said hood means with the compartments, with the liquid exerting a buoyant force on said hood means to reduce the force required at said translation means to support said hood means, stack means to provide fluid communication from a point within a compartment to a point below the media support surface of a compartment;

tube means mounted to said hood for selective flow communication with said stack means in a compartment selectively covered by said hood means;

valve means selectively operable to open to allow flow from said tube means into said stack means when said flow communication is established;

whereupon a flowpath from said tube means, through said stack means, through said porous media support surface, through the media in a compartment is created.

65. The apparatus of claim 64, wherein:

said stack means selectively engagable to said tube means before sealing between said sealing surface and the partitions of a compartment to selectively leave a gap therebetween; and said valve means is located in each of said stack means, whereupon the media can be scoured by virtue of a gas introduced through said tube means which, when said tube means is in flow communication with said stack means, results in opening said valve means and gas flow through said stack means, through the porous media support surface, through the media, and out of the compartment through said gap.

66. The apparatus of claim 65, wherein:

said partitions extend out the opposite side of said media support surface, creating a plurality of underside compartments substantially aligned with said compartments above said media support surface.

67. The apparatus of claim 66, further comprising:

said stack means extending into and in flow communication with said underside compartments.

68. The apparatus of claim 67, wherein:

said tube means is flexibly mounted to move with respect to said hood means, to selectively establish flow communication with said stack means;

vent means with said hood to selectively allow gas trapped within said hood to escape.

69. The apparatus of claim 68, further comprising:

said hood means further comprising sealing means selectively engageable to close said gap between said hood and a compartment;

means with said hood means to produce flow from an underside compartment, through a compartment and to said hood, said sealing means selectively operable with said flow production means to seal between said hood means and a compartment during activation of said flow production means; and vent means with said hood to selectively allow gas trapped within said hood to escape prior to actuation of said flow production means.

70. The apparatus of claim 69, wherein:

said valve means are biased closed by buoyant forces created by fluid which may be present in stack means;

said moving means moving said hood means in only one plane.

71. The apparatus of claim 70, further comprising:

means for supplying a compressible fluid into said tube means;

said fluid flow producing means is a liquid pump.

72. The apparatus of claim 71, wherein said translation means comprises:

braking means for preventing movement of a portion of said drive means with respect to another portion of said drive means; and at least one track or cable located on the filter along which the apparatus moves.

73. The apparatus of claim 72, wherein said drive means comprises:

clamping means for receiving a pressurized fluid, said clamping means being held in said drive means and changing in volume to clamp portions of said drive means against the track or cable to prevent movement of said portions of said drive means.

74. The apparatus of claim 73, wherein said clamping means comprises:

a bar having an opening;

a diaphragm surrounding said bar and having an opening aligned with said bar opening; and a brake pad adjacent said diaphragm which engages said track or cable to prevent movement of said portions of said second means whenever a pressurized fluid is provided to said diaphragm through said opening thereof.

75. The apparatus of claim 73, wherein said clamping means further comprises:

a bellows having an opening for receiving a pressurized fluid, upon receipt of said pressurized fluid, said bellows changing in volume for use in preventing movement of said portions of said second means.

76. The apparatus of claim 72, wherein said drive means further comprises:

a pair of pivotally connected cams, said cams positioned on opposite sides of said track or cable to selectively permit movement of said hood in one direction but to prevent movement thereon in an opposite direction.

77. The apparatus of claim 72, further comprising:

a first body member including a slide member positioned on the track, said slide member having an opening to receive a pressure brake line for carrying pressurized fluid, said first body member further including clamping means connected to said pressure brake line;

a second body member including a slide member positioned on the track, said slide member having an opening to receive a pressure brake line for carrying pressurized fluid, said second body member further including clamping means connected to said pressure brake line;

a third body member including a slide member positioned on the track, said slide member having an opening to receive a pressure brake line for carrying pressurized fluid, said third body member further including clamping means connected to said pressure brake line;

a first cylinder having two ends and being fastened to said second body member and a second cylinder having two ends and being fastened to said second body member, each of said first and second cylinders having a pair of openings adjacent said ends of said first and second cylinders, each of said first and second cylinder openings receiving pressure drive lines for carrying pressurized fluid, said first body member being moved relative to said second body member after pressurized fluid is provided to said second body member clamping means through said pressure brake line thereof and when pressurized fluid is provided through one of said pressure drive lines to said first and second cylinder openings located adjacent to said third body member.

78. The apparatus of claim 67, wherein said drive means comprises:

clamping means for receiving a pressurized fluid, said clamping means being held in said drive means and changing in volume to clamp portions of said drive means against the track or cable to prevent movement of said portions of said drive means.

79. The apparatus of claim 78, wherein said clamping means comprises:

a bar having an opening;

a diaphragm surrounding said bar and having an opening aligned with said bar opening; and a brake pad adjacent said diaphragm which engages said track or cable to prevent movement of said portions of said second means whenever a pressurized fluid is provided to said diaphragm through said opening thereof.

80. The apparatus of claim 78, wherein said clamping means further comprises:

a bellows having an opening for receiving a pressurized fluid, upon receipt of said pressurized fluid, said bellows changing in volume for use in preventing movement of said portions of said second means.

81. The apparatus of claim 64, wherein said drive means further comprises:

a first body member;

a second body member connected to said first body member;

a third body member connected to said second body member;

first means for connecting said first body member to said second body member, at least portions of said first means being extendable relative to said second body member in a first direction to move said first body member relative to said second body member; and second means for connecting said second body member to said third body member, at least portions of said second means being extendable relative to said second body member in a second direction to move said third body member relative to said second body member.

82. The apparatus of claim 81, wherein:

said translation is defined by the movement of said first and third body members relative to said second body member.

83. The apparatus of claim 81, wherein:

said translation is defined by the movement of said second body member relative to said first and third body members.

84. The apparatus of claim 81, wherein:

at least portions of said first means is retractable with respect to said second body member to move said second body member relative to said first body member.

85. The apparatus of claim 84, wherein said first means comprises:

cylinder means having opposing ends and connected to said second body member, said cylinder means having an opening adjacent each of said ends for receiving a pressurized fluid;

rod means connected to each of said ends of said cylinder means for reciprocating movement inwardly and outwardly of said cylinder means; and piston means within said cylinder means and connected to each of said rod means so that, when pressurized fluid is provided to said cylinder means through at least one of said cylinder means openings, said piston means and said rod means are driven in a predetermined direction.

86. The apparatus of claim 64, wherein said translation means comprises:

braking means for preventing movement of a portion of said drive means with respect to another portion of said drive means; and at least one track or cable located on the filter along which the apparatus moves.

87. The apparatus of claim 86, wherein said drive means further comprises:

a pair of pivotally connected cams, said cams positioned on opposite sides of said track or cable to selectively permit movement of said hood in one direction but to prevent movement thereon in an opposite direction.

88. The apparatus of claim 71, wherein said drive means further comprises:

a first body member;

a second body member connected to said first body member;

a third body member connected to said second body member;

first means for connecting said first body member to said second body member, at least portions of said first means being extendable relative to said second body member in a first direction to move said first body member relative to said second body member; and second means for connecting said second body member to said third body member, at least portions of said second means being extendable relative to said second body member in a second direction to move said third body member relative to said second body member.

89. The apparatus of claim 88, wherein:

said translation is defined by the movement of said first and third body members relative to said second body member.

90. The apparatus of claim 88, wherein:

said translation is defined by the movement of said second body member relative to said first and third body members.

91. The apparatus of claim 88, wherein:

at least portions of said first means is retractable with respect to said second body member to move said second body member relative to said first body member.

92. The apparatus of claim 91, wherein said first means comprises:

cylinder means having opposing ends and connected to said second body member, said cylinder means having an opening adjacent each of said ends for receiving a pressurized fluid;

rod means connected to each of said ends of said cylinder means for reciprocating movement inwardly and outwardly of said cylinder means; and piston means within said cylinder means and connected to each of said rod means so that, when pressurized fluid is provided to said cylinder means through at least one of said cylinder means openings, said piston means and said rod means are driven in a predetermined direction.

93. The apparatus of claim 86, further comprising:

a first body member including a slide member positioned on the track, said slide member having an opening to receive a pressure brake line for carrying pressurized fluid, said first body member further including clamping means connected to said pressure brake line;

a second body member including a slide member positioned on the track, said slide member having an opening to receive a pressure brake line for carrying pressurized fluid, said second body member further including clamping means connected to said pressure brake line;

a third body member including a slide member positioned on the track, said slide member having an opening to receive a pressure brake line for carrying pressurized fluid, said third body member further including clamping means connected to said pressure brake line;

a first cylinder having two ends and being fastened to said second body member and a second cylinder having two ends and being fastened to said second body member, each of said first and second cylinders having a pair of openings adjacent said ends of said first and second cylinders, each of said first and second cylinder openings receiving pressure drive lines for carrying pressurized fluid, said first body member being moved relative to said second body member after pressurized fluid is provided to said second body member clamping means through said pressure brake line thereof and when pressurized fluid is provided through one of said pressure drive lines to said first and second cylinder openings located adjacent said third body member.

* * * * *